(12) United States Patent
Choi

(10) Patent No.: US 6,387,140 B1
(45) Date of Patent: May 14, 2002

(54) FLUID STREAM VELOCITY DISTRIBUTION CONTROL

(75) Inventor: Kyung-Ju Choi, Jefferson County, KY (US)

(73) Assignee: AAF-McQuay, Inc., Louisville, KY (US)

( * ) Notice: Subject to any disclaimer, the term of this patent is extended or adjusted under 35 U.S.C. 154(b) by 0 days.

(21) Appl. No.: 09/634,153

(22) Filed: Aug. 9, 2000

(51) Int. Cl.⁷ ................................................ B01D 46/00
(52) U.S. Cl. .................... 55/323; 55/324; 55/332; 55/418; 55/501; 55/511; 55/DIG. 31; 95/273
(58) Field of Search ..................... 55/323, 324, 327, 55/332, 418, 501, 511, DIG. 31; 210/495, 767; 95/273

(56) References Cited

U.S. PATENT DOCUMENTS

| | | | |
|---|---|---|---|
| 2,205,706 A | * | 6/1940 | Wolff .......................... 210/695 |
| 3,725,271 A | * | 4/1973 | Giannotti .................... 210/767 |
| 3,923,482 A | * | 12/1975 | Knab et al. ................... 55/412 |
| 5,296,331 A | * | 3/1994 | Milet et al. ................... 55/418 |
| 5,423,893 A | * | 6/1995 | Kotaki ......................... 55/511 |
| 5,782,944 A | | 7/1998 | Justice |
| 5,810,897 A | * | 9/1998 | Konosu et al. ............... 55/418 |
| 5,897,776 A | | 4/1999 | Mallabone |
| 5,922,095 A | * | 7/1999 | Hustvedt et al. .............. 55/418 |
| 6,045,597 A | | 4/2000 | Choi |

OTHER PUBLICATIONS pp. 44–47 Transport Phenoma by Bird, Steward & Lightfoot, published 1960.

* cited by examiner

Primary Examiner—David A. Simmons
Assistant Examiner—Minh-Chau T. Pham
(74) Attorney, Agent, or Firm—Polster, Lieder, Woodruff & Lucchesi

(57) ABSTRACT

An arrangement for filtering a particulate-laden fluid stream in a confined flow-through passage which includes a porous filter media extending thereacross and a velocity distribution control member cooperative with said filter media to preselectively control the velocity of the fluid stream as such fluid stream passes through the entirety of the porous filter media.

18 Claims, 2 Drawing Sheets

$$v = \frac{(P_0 - P_L)R^2}{4\mu L}\left[1-\left(\frac{r}{R}\right)^2\right]$$

$\mu$ = VISCOCITY OF FLUID

FLUID STREAM VELOCITY DISTRIBUTION CONTROL

BACKGROUND OF THE INVENTION

The present invention relates to an arrangement for controlling the velocity distribution of a fluid stream and more particularly an apparatus and accompanying method for controlling the velocity distribution of a fluid stream, such as air, as it passes through a confined, flow-through, filtering passage.

It is well known in the filtration art to encase a filtration member in a border frame for insertion in a flow-through passage, attention being directed to U.S. Pat. No. 5,782,944, issued to T. A. Justice on Jul. 21, 1998, wherein a pleated filter member is surroundingly enclosed by a flow-through border member with the upstream and downstream panels of the border member having large openings therethrough of indiscriminate size and configuration. It also is well known to centrally concentrate pleats in a pleated filter media and to vary the amplitude thereof to address the actual velocity profile, capacity, efficiency, and resistance of filter media, attention being directed to U.S. Pat. No. 5,897,776; issued to M. R. Mallabone on Apr. 27, 1999. Further, it is known to employ spacer strands of different cross-sectional thickness to support the pleats of filter media such as disclosed in U.S. Pat. No. 6,045,597, issued to Kyung-Ju Choi on Apr. 4, 2000. Finally, it is generally known to mathematically determine velocity flow of a fluid stream through development of the Hagen-Poisuelle law, attention being directed to pages 44–47 of *Transport Phenomena* by Bird, Steward and Lightfoot, published 1960.

The present invention, recognizing the importance and desirability of velocity distribution control of a fluid stream in an enclosed flow passage and particularly the importance of controlling the overall velocity distributed of a particulate laden stream of air to be passed through filtration media disposed in a confined flow-through passage, provides a unique fluid stream velocity distribution control arrangement which allows for a preselected overall velocity distribution control of such fluid stream whether it be preselectively uniform throughout in a flow-through passage or preselectively variable in accordance with the nature and type of treatment to be employed with request to such flow-through passage.

The unique overall velocity distribution control arrangement including an inventive apparatus and companion, inventively unified method of the disclosure hereinafter is both straight forward and economical, requiring a minimum of parts and a minimum of steps in construction, maintenance and use, and, at the same time, allows for ready configuration variation whenever desired in a fluid flow system.

Various other features of the present invention will become obvious to one skilled in the art upon reading the disclosure as set forth herein.

BRIEF SUMMARY OF THE INVENTION

More particularly, the present invention provides a fluid stream velocity distribution control arrangement comprising: a fluid flow through confined passage including an upstream inlet and a downstream outlet, the flow-through confined passage having an inner peripheral surface between the inlet and outlet thereof; a velocity control member disposed in cooperation with the flow through passage, the member being sized to extend fully across the inner peripheral surface with the peripheral edge of the velocity distribution control member snuggly abutting the inner peripheral surface of the flow-through passage; and, a plurality of spaced flow-through openings in the velocity distribution control member preselectively spaced and configured to control the overall velocity distribution of a fluid passing therethrough in a preselected manner.

The present invention further provides the novel and inventively unified companion method of controlling the velocity distribution of a fluid stream comprising; passing the fluid stream through a confined flow-through passage zone including an upstream inlet and downstream outlet with an inner peripheral passage zone surface extending therebetween; and, controlling the velocity distribution of such fluid stream as it flows through the passage zone by passing such fluid stream through a plurality of spaced flow-through apertures cooperative with the passage zone, the spaced apertures being configured to control the velocity distribution of the fluid stream flowing through the passage zone.

Another novel feature present invention is the utilization of the aforedescribed apparatus and method in combination with a filtering arrangement disposed in the flow-through passage zone, the inventive velocity distribution control arrangement being employed with a particulate carrying air stream and the filter media being an air filter media of any one of several possible configurations. Further, the present invention provides for the novel utilization of a formula derived from the aforementioned known Hagen-Poiseulle law to control overall fluid stream velocity distribution in a preselected manner with respect to an overall cross-section of a flow-through passage.

It is to be understood that various changes can be made by one skilled in the art in one or more of the several parts and several steps of the invention disclosed herein without departing from the scope or spirit of the present invention. For example, the configuration and spacing of apertures can be varied with concomitant varying overall cross-sectional changes in velocity distribution of the fluid stream passing through the confined passage. Further, location of the velocity distribution control arrangement and the type and configuration of the filter media can be varied in accordance with the preselected results desired.

BRIEF DESCRIPTION OF THE DRAWINGS

Referring to the drawings which disclose several possible embodiments of the present invention.

DETAILED DESCRIPTION OF THE INVENTION

Figure 1:
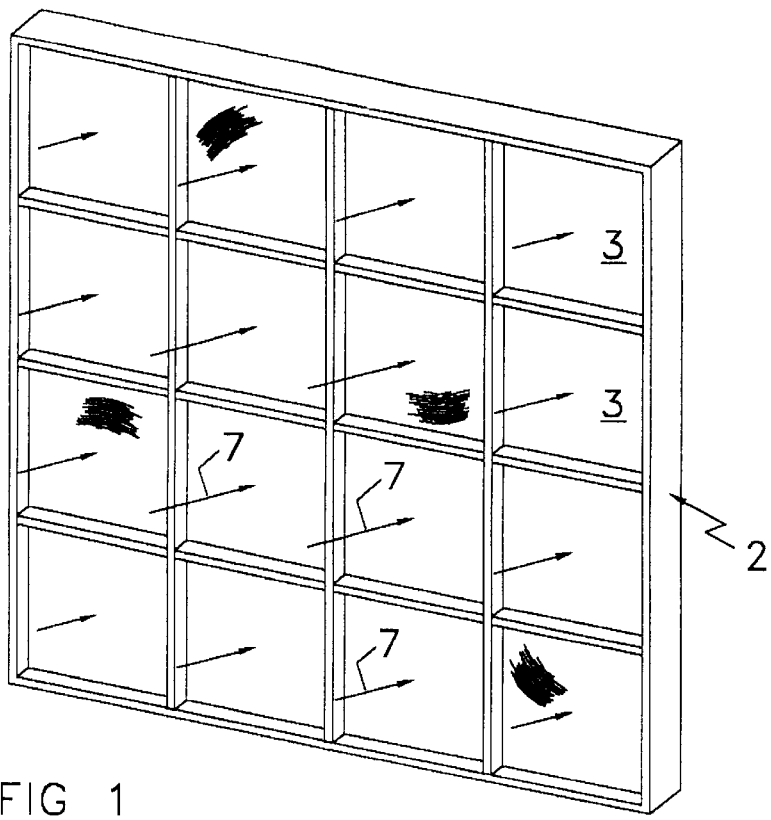
FIG. 1 is a schematic, isometric view of a flow-through frame bank of a fluid handling unit including sixteen (16) flow-through frame passages or openings with varying arrow lengths representing controlled velocity distribution differences through an overall cross-section of the flow-through frame passages.
Figure 2:
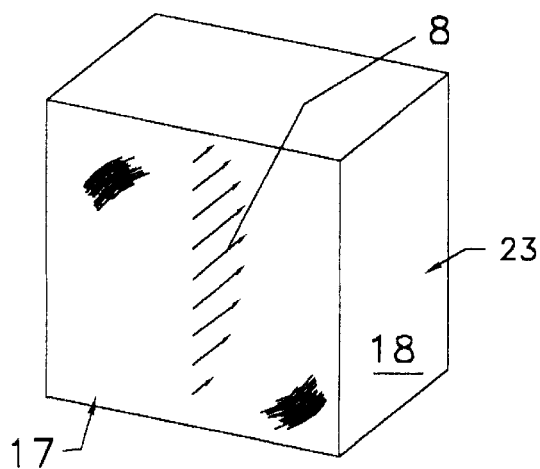
FIG. 2 is a schematic, isometric view of a single flow-through passage with varying arrow lengths representing approximate fluid velocity distribution vectors through an overall cross-section of a simple flow-through passage.

Referring to FIG. 1 of the drawings, an overall flow-through border frame bank of a fluid handling unit 2 is disclosed for supporting a plurality of individual flow-through border frames 3 such as disclosed in FIG. 2 of the drawings. In a typical air filtration operation, the frame 2 can be formed from any one of a number of rigid materials, such as metal, as can the border frames 3, which also can be of a stiff cardboard material and which can include a velocity distribution control panel member, such as disclosed in FIGS. 4–6, bearing the reference numerals 4, 5 and 6, respectively, as described hereinafter. These panel members 4, 5 and 6 can be integral and part of each unit, flow-through border frame, such as frame 3 (FIG. 2), or can be individually separate therefrom to be positioned adjacent to and upstream or even downstream to a sheet of suitable filter medium extending across the border frame with the peripheral edge of the filter medium snuggly engaging the inner peripheral surface of a border frame and with either the border frame or the filter panel, as the case might be, snuggly engaging the inner peripheral surface of the flow-through passage in which it is to be mounted. It is to be understood that any one of a number of appropriately configured types of filter media can be utilized depending upon the fluid stream to be filtered, such as, but not limited to, natural, synthetic or combination of natural and synthetic or glass fibers.

Again referring to FIG. 1 of the drawings, it can be seen, as illustrated by the length of arrows 7, that the overall velocity of a fluid stream passing through flow-through border frame 2 can be so controlled that the velocity distribution vector, and accordingly arrow length, is the greatest in the central area and that the velocity decreases adjacent the peripheral edge of frame 2. In like fashion, as can be in FIGS. 2 and 3, the velocity distribution vectors through each unit flow-through border frame 3 can be so controlled that the velocity distribution vectors are the greatest, as illustrated by the length of arrow 8, at the central portion of flow-through border frame 3 and the velocity distribution vectors decrease toward the peripheral edge of frame 3.

Figure 4:
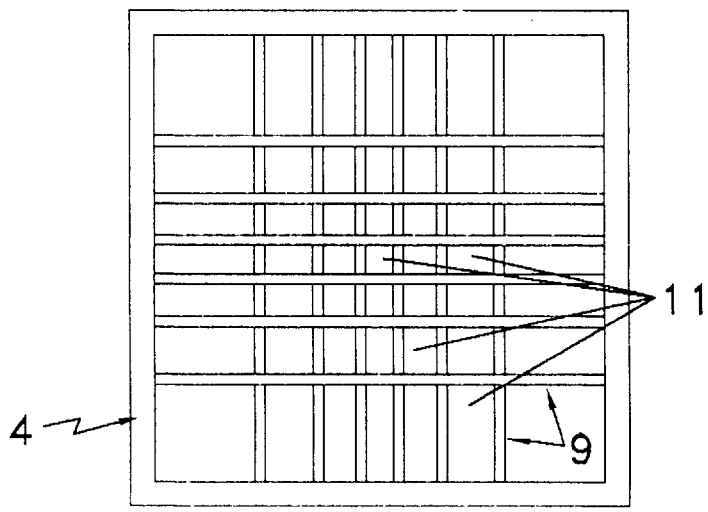
FIG. 4 is a front elevational view of a rectangular flow-through panel arrangement in accordance with the present invention, the flow-through area apertures increasing in size from the center outwardly toward the border or peripheral edge of the panel; and, FIGS. 5 and 6 are front elevational views of flow-through panel arrangements with the borders or peripheral edges of both being rectangular, the apertures in FIG. 5 being of arc-shaped cross-section and the apertures in FIG. 6 being of centrally square and outwardly trapezoidal shape, the flow-through apertures in both figures—like in FIG. 4—increasing in size from the center outwardly toward the border or peripheral edge in each of the panel arrangements.
Figure 5:
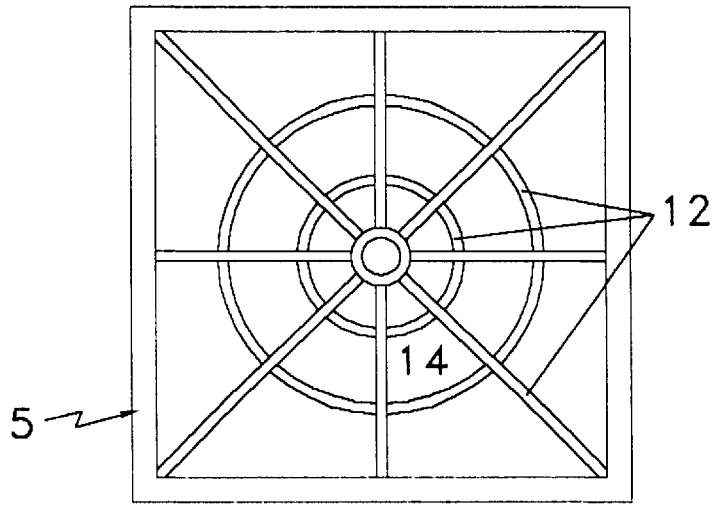
Figure 6:
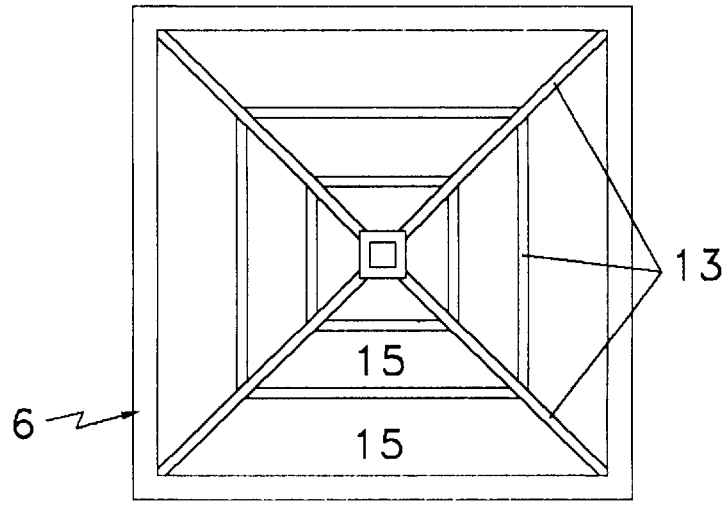

Referring to FIGS. 4–6, three possible geometric panel configurations are disclosed by panels 4, 5 and 6, respectively. It is to be understood that these panels each can be a separate unit or as part of a media containing border frame member. In FIG. 4, a plurality of crossing spaced parallel bar sets 9 are disclosed. The spacing between adjacent bars 9 of each set varies so that flow-through apertures 11 vary in size, with the rectangular shaped central apertures being of smaller area than the rectangular shaped apertures adjacent the peripheral edge of flow-through frame 4. In FIGS. 5 and 6, spaced bars 12 and 13 are so arranged concentrically to form trapezoidal arc shaped apertures 14 (FIG. 5) and frustrum shaped apertures 15, respectively again with the central flow-through, apertures in the form of a circle and square, respectively being of smaller area than the flow-through apertures adjacent the respective peripheral edges of the flow-through frames 5 and 6. In the panels of FIGS. 4–6, the flow through apertures disclosed can be arranged and sized to provide a substantially uniform fluid stream velocity flow over an overall cross-sectional area taken between the upstream inlet and downstream outlet of a confined passage 16.

Figure 3:
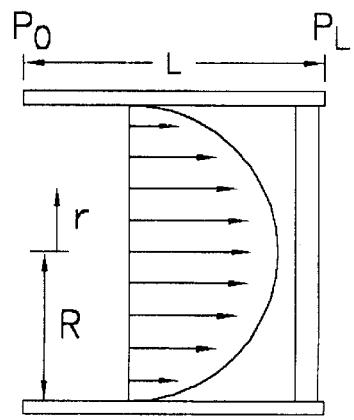
FIG. 3 is a schematic, cross-sectional view also of a single flow-through annulus channel passage also with varying arrow lengths representing similar velocity distribution vectors as in FIG. 1, along with appropriate lettering in accordance with the novel formula employed in the present invention.

Referring to this FIG. 3, a schematic representation of the inventive use of a formula as derived from the known Hagen-Poiseulle law can be used to control fluid stream velocity over a given cross-sectional passage area as illustrated. The novel fluid stream velocity distribution formula through an annulus passage can be simply stated as:

$$V = \frac{(P_O - P_L)R^2}{4\mu L}\left[1 - \left(\frac{r}{R}\right)^2\right]$$

with "V" representing velocity distribution; "$P_O$" representing fluid stream upstream pressure; "$P_L$" representing fluid stream downstream pressure; "$\mu$" representing fluid viscosity; "L" representing confined passage length; "r" representing a varying distance from the censor of an annulus passage; and, "R" representing overall distance from the center of the passage to the farthest distance point on the peripheral edges of the inner passage surface.

It is to be understood that the fluid stream velocity distribution control as described herein is not to be considered as limited to a controlled velocity which is substantially uniform in a fluid stream passing through a preselected overall cross-section of a confined flow-through passage but that the velocity can be so controlled as to be varied at different preselected locations of such overall cross-section as might be desirable in a particular fluid stream usage.

In summary, a fluid filter arrangement for treating a particulate-laden air stream to be passed through the inner peripheral surface of a confined flow-through passage of preselected cross-section is disclosed. As can be seen in FIG. 2, a porous fiber filter media 17 having spaced upstream and downstream faces with a peripheral edge extending there around can be snuggly surrounded by a cardboard filter frame such as 18. The frame 18 with the filter media 17 disposed therein has a peripheral edge sized and shaped to extend entirely across the flow-through passage in overall, snug peripheral engagement with the inner peripheral surface of a flow-through passage. A flow-through velocity control panel member such as 4, 5 and 6, respectively, (FIGS. 4–6), is disposed along the entirety of the upstream face of the media carrying cardboard border member or frame 18 adjacent the upstream (or downstream) face of filter media 17. The panel members 4, 5 and 6, each has a peripheral edge surrounding a plurality of spaced flow-through passages 11, 14, and 15 respectively disposed therein each of which is sized and shaped so as to increase in cross-sectional area from the center to the peripheral edge of the respective panel member so as to provide a uniform velocity distribution over the overall upstream face. of the filter media as can be determined by the formula:

$$V = \frac{(P_O - P_L)R^2}{4\mu L}\left[1 - \frac{r_2}{R}\right],$$

with "V" representing velocity distribution, "$P_O$" representing fluid stream upstream pressure; "$P_L$" representing fluid stream downstream pressure; "$\mu$" representing fluid viscosity; "L" representing confined passage length; "r" representing a varying distance from the center of an annulus passage; and, "R" representing overall distance from the center of the peripheral edges of the passage to the furthest distance point on the peripheral edge of the passage.

The related unified, inventive method of filtering particulate matter from a particulate-laden air stream includes the novel following steps: passing a particulate-laden air stream through a confined flow-through passage zone including an upstream dirty air inlet and a downstream clean air outlet with an inner peripheral passage zone surface extending therebetween. Disposing a fibrous filter medium having upstream and downstream faces in the flow-through passage zone between the dirty air upstream inlet and the clean gas outlet, the filter medium being sized and configured to extend substantially across the flow-through passage with a peripheral edge in snug contact with the inner peripheral passage zone surface. Disposing a velocity control panel in the passage adjacent and parallel to the upstream face of the filter medium, the panel being sized similarly to the filter medium, the velocity control panel including a plurality of spaced flow-through passages disposed therein sized and shaped to increase in cross-sectional area from the center to the peripheral edge of the panel member to provide a uniform velocity distribution over the overall upstream face of the filter medium. The fluid stream velocity in the flow-through passage is determined by the formula:

$$V = \frac{(P_O - P_L)R^2}{4\mu L}\left[1 - \frac{r_2}{R}\right],$$

with "V" representing velocity distribution, "$P_O$" representing fluid stream upstream pressure; "$P_L$" representing fluid stream downstream pressure; "$\mu$" representing fluid viscosity; "L" representing confined passage length; "r" representing a varying distance from the center of an annulus passage; and, "R" representing overall distance from the center of the peripheral edges of the passage zone to the furthest distance point on the inner surface of the zone.

The invention claimed is:

1. A fluid filter arrangement for treating a fluid stream to be passed through the inner peripheral surface of a confined flow-through passage of preselected cross-section comprising: a flow through border frame member having a plurality of removable, replaceable unit filter frame members each having an inner peripheral surface defining a flow-through passage therethrough with a porous filter member having peripheral edges and including upstream and downstream faces extending therebetween, said unit filter members being sized to extend substantially completely across said flow-through border frame passage to snugly engage with said inner peripheral surface of said confined flow-through border frame passage; and, a separately framed and readily removable flow-through fluid velocity distribution control member cooperative with said confined flow-through border frame passage and said unit filter members disposed therein to provide selectively located and controlled fluid velocity distribution of said fluid stream throughout as it passes through said unit filter members.

2. The fluid filter arrangement of claim 1, said flow-through fluid velocity distribution control member comprising a panel having peripheral edges corresponding with said peripheral edges of said border frame member having said unit filter members and having flow-through apertures preselectively spaced, sized, shaped and disposed therein to insure said selectively located and controlled velocity of a fluid stream passing through said unit filter members.

3. The fluid filter arrangement of claim 2, said panel being positioned adjacent said upstream face of said unit filter members.

4. The fluid filter arrangement of claim 2, said panel being positioned adjacent said downstream face of said unit filter members.

5. The fluid filter arrangement of claim 2, said panel being part of a flow-through border frame member sized to snugly receive said peripheral edges of said unit filter members.

6. The fluid filter arrangement of claim 2, said spaced flow-through apertures in said panel member increasing in cross-sectional area from the center to said peripheral edges thereof.

7. The fluid filter arrangement of claim 1, wherein said velocity distribution is determined by the formula:

$$V = \frac{(P_O - P_L)R^2}{4\mu L}\left[1 - \left(\frac{r}{R}\right)^2\right],$$

with "V" representing velocity distribution; "$P_O$" representing fluid stream upstream pressure; "$P_L$" representing fluid stream downstream pressure; "$\mu$" representing fluid viscosity; "L" representing confined passage length; "r" representing a varying distance from the center of an annulus passage; and, "R" representing overall distance from the center of said peripheral edge of said panel to the furthest distant point on said peripheral edge of said panel.

8. The fluid filter arrangement of claim 1, wherein said fluid stream is a particulate carrying gas stream.

9. The fluid filter arrangement of claim 1, wherein said filter member is a polymeric medium.

10. The fluid filter arrangement of claim 1, wherein said filter member is natural fibers.

11. The fluid filter arrangement of claim 1, wherein said filter member is a combination of natural and synthetic fibers.

12. The fluid filter arrangement of claim 1, wherein said filter member is a fiberglass media.

13. A method of filtering particulate matter from a particulate-laden fluid stream comprising: passing said particulate-laden fluid stream through a confined border frame flow-through passage zone including an upstream fluid stream inlet and a downstream fluid stream outlet; disposing a plurality of preselected framed porous filter media units in said confined border frame flow through passage zone between said upstream inlet and said downstream outlet, said filter media units each having a peripheral edge and upstream and downstream faces surrounded thereby with said units including a cross-sectional area sufficient to extend substantially completely across said border frame flow-through passage; disposing a flow-through velocity distribution control member cooperative with said filter media units, said velocity distribution control member having a plurality of spaced fluid stream flow-through apertures of preselectively sized and configured cross-sectional area and at preselected locations to selectively locate and control the face velocity distribution of said fluid stream as it pastes through said filter media units.

14. The method of filtering particulate matter from a particulate-laden fluid stream of claim 13, wherein said flow-through spaced apertures in said velocity distribution control member are so sized in cross-sectional area and so located that the face velocity distribution of said fluid stream is substantially the same over the overall cross-sectional area of said filter media units as said fluid stream passes therethrough.

15. The method of filtering particulate matter from a particulate-laden fluid stream of claim 13, wherein said flow through velocity distribution control member is disposed in said confined passage zone adjacent said upstream face of said filter media units.

16. The method of filtering particulate matter from a particulate-laden fluid stream of claim 13, wherein said face velocity distribution by said velocity distribution control member is calculatively determined by the formula:

$$V = \frac{(P_O - P_L)R^2}{4\mu L}\left[1 - \left(\frac{r}{R}\right)^2\right],$$

with "V" representing velocity distribution, "$P_O$" representing fluid stream upstream pressure; "$P_L$" representing fluid stream downstream pressure, "$\mu$" representing fluid viscosity; "L" representing confined passage length; "r" representing a varying distance from the center of an annulus passage; and, "R" representing overall distance from the center of said peripheral edge to the furthest distant point on said peripheral edge.

17. A fluid filter arrangement for treating a particulate-laden air stream to be passed through the inner peripheral surface of a confined flow-through passage of preselected cross-section comprising: a border frame including a plurality of porous filter media units, each unit having spaced upstream and downstream faces with a peripheral edge therebetween snuggly surrounded by a cardboard filter frame, said border frame with said filter media units disposed therein having a peripheral edge sized and shaped to extend entirely across said flow-through passage in overall, snug peripheral engagement with said inner peripheral surface of said flow-through passage; and, a flow-through velocity distribution control panel member disposed along the entirety of the upstream face of said border frame member adjacent said upstream face of said filter media unit, said panel member having a peripheral edge surrounding a plurality of spaced flow-through passages disposed therein which are sized and shaped so as to increase in cross-sectional area from the center to said peripheral edge of slid panel member to provide a uniform velocity distribution over said overall upstream face of said filter media units is determined by the formula:

$$V = \frac{(P_O - P_L)R^2}{4\mu L}\left[1 - \left(\frac{r}{R}\right)^2\right],$$

with "V" representing velocity distribution, "$P_O$" representing fluid stream upstream pressure, "$P_L$" representing fluid stream downstream pressure; "$\mu$" representing fluid viscosity; "L" representing confined passage length; "r" representing a varying distance from the center of an annulus passage, and, "R" representing overall distance from the center of said peripheral edge to the furthest distant point on said peripheral edge.

18. A method of filtering particulate matter from a particulate-laden air stream comprising passing said particulate-laden air stream through a confined flow-through passage zone including an upstream dirty air inlet and a downstream clean air outlet and having an inner peripheral passage surface; disposing a border frame including a plurality of porous fibrous filter media units having upstream and downstream faces in said flow-through passage zone between said ditty air upstream inlet and said clean air outlet, said border fame with said filter media units being sized to extend substantially across said flow-through passage and having a peripheral edge in snug contact with said inner peripheral passage surface; and, disposing a velocity distribution control panel in said passage adjacent and parallel to said upstream face of said filter media and sized similarly to said border frame with said filter media units, said velocity control distribution panel including a plurality of spaced flow-through apertured passages therein sized and shaped to increase in cross-sectional area from the center to said peripheral edge of said panel member to provide a uniform velocity distribution over said overall upstream face of said filter media units determined by the formula:

$$V = \frac{(P_O - P_L)R^2}{4\mu L}\left[1 - \left(\frac{r}{R}\right)^2\right],$$

with "V" representing velocity distribution, "$P_O$" representing fluid stream upstream pressure; "$P_L$" representing fluid stream downstream pressure; "$\mu$" representing fluid viscosity; "L" representing confined passage length; "r" representing a varying distance from the center of an annulus passage; and, "R" representing overall distance from the center of said flow-through passage to the furthest distant point on said peripheral edge.

* * * * *